(12) United States Patent
Courchesne

(10) Patent No.: US 8,269,951 B1
(45) Date of Patent: Sep. 18, 2012

(54) AUDIBLE DISTANCE MEASURING ASSEMBLY

(76) Inventor: Richard L. Courchesne, Forth Worth, TX (US)

( * ) Notice: Subject to any disclaimer, the term of this patent is extended or adjusted under 35 U.S.C. 154(b) by 154 days.

(21) Appl. No.: 12/571,915

(22) Filed: Oct. 1, 2009

(51) Int. Cl.
*G01C 3/08* (2006.01)
(52) U.S. Cl. .................................................. 356/5.01
(58) Field of Classification Search ................... 356/5.01
See application file for complete search history.

(56) References Cited

U.S. PATENT DOCUMENTS

| | | | |
|---|---|---|---|
| 4,984,177 A | 1/1991 | Rondel et al. | |
| 5,938,593 A | 8/1999 | Ouellette | |
| 5,946,376 A | 8/1999 | Cistulli | |
| 7,100,435 B2 | 9/2006 | Fujioka | |
| 7,199,866 B2 | 4/2007 | Gogolla et al. | |
| 7,230,683 B2 | 6/2007 | Stierle et al. | |
| D548,118 S | 8/2007 | Snider et al. | |
| 2006/0059704 A1 | 3/2006 | Wilson | |

*Primary Examiner* — Thomas Tarcza
*Assistant Examiner* — Antoine J Bedard

(57) ABSTRACT

An audible distance measuring assembly includes a housing that has a front wall and a rear wall. A laser emitter is mounted in the housing and emits laser light outwardly of the front wall. A light detector is mounted in the housing and captures reflected laser light received through a window in the front wall. A processor is mounted in the housing and is electrically coupled to the laser emitter and the light detector. The processor is programmed to determine a distance between the housing an object off of which the laser light is reflected. A measure actuator is mounted on the housing and is electrically coupled to the processor. The measure actuator actuates the laser emitter and the light detector when actuated. A sound emitter is mounted in the housing and is electrically coupled to the processor. The processor is programmed to audibly indicate the distance.

6 Claims, 5 Drawing Sheets

AUDIBLE DISTANCE MEASURING ASSEMBLY

BACKGROUND OF THE DISCLOSURE

Field of the Disclosure

The disclosure relates to distance measuring devices and more particularly pertains to a new distance measuring device for audibly providing a measured distance.

SUMMARY OF THE DISCLOSURE

An embodiment of the disclosure meets the needs presented above by generally comprising a housing that has a top wall, a back wall, a front wall, a rear wall, a first lateral wall and a second lateral wall. A laser emitter is mounted in the housing and emits laser light outwardly of the front wall when the laser emitter is turned on. A light detector is mounted in the housing and captures light received through a window in the front wall. The light detector receives the laser light when the laser light is reflected off an object. A processor is mounted in the housing and is electrically coupled to the laser emitter and the light detector. The processor is programmed to determine a distance between the housing and the object off of which the laser light is reflected. A measure actuator is mounted on the housing and is electrically coupled to the processor. The measure actuator actuates the laser emitter and the light detector when the measure actuator is actuated. A sound emitter is mounted in the housing and is electrically coupled to the processor. The processor is programmed to audibly indicate the distance.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
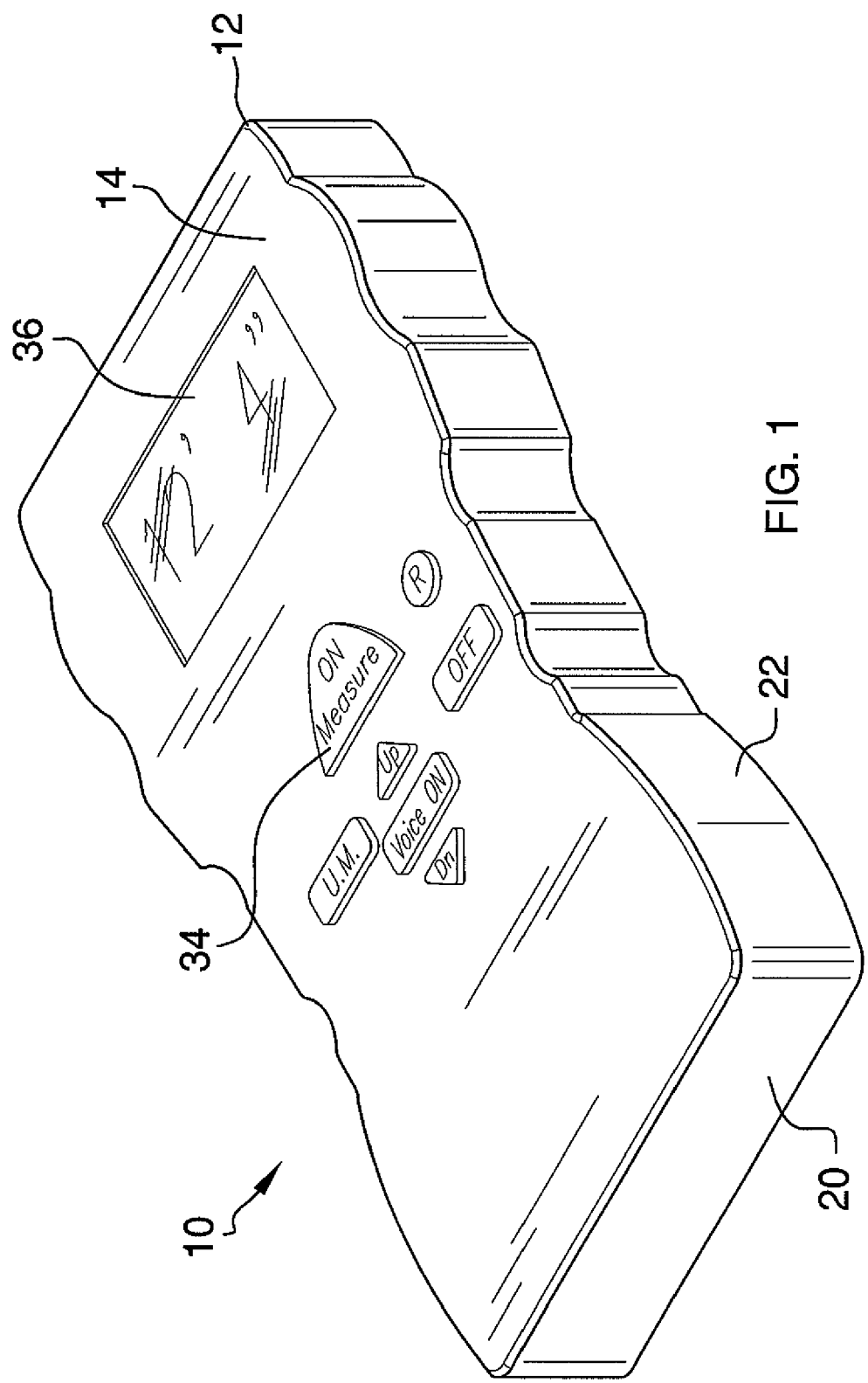
FIG. 1 is a top perspective view of a audible distance measuring assembly according to an embodiment of the disclosure.
Figure 2:
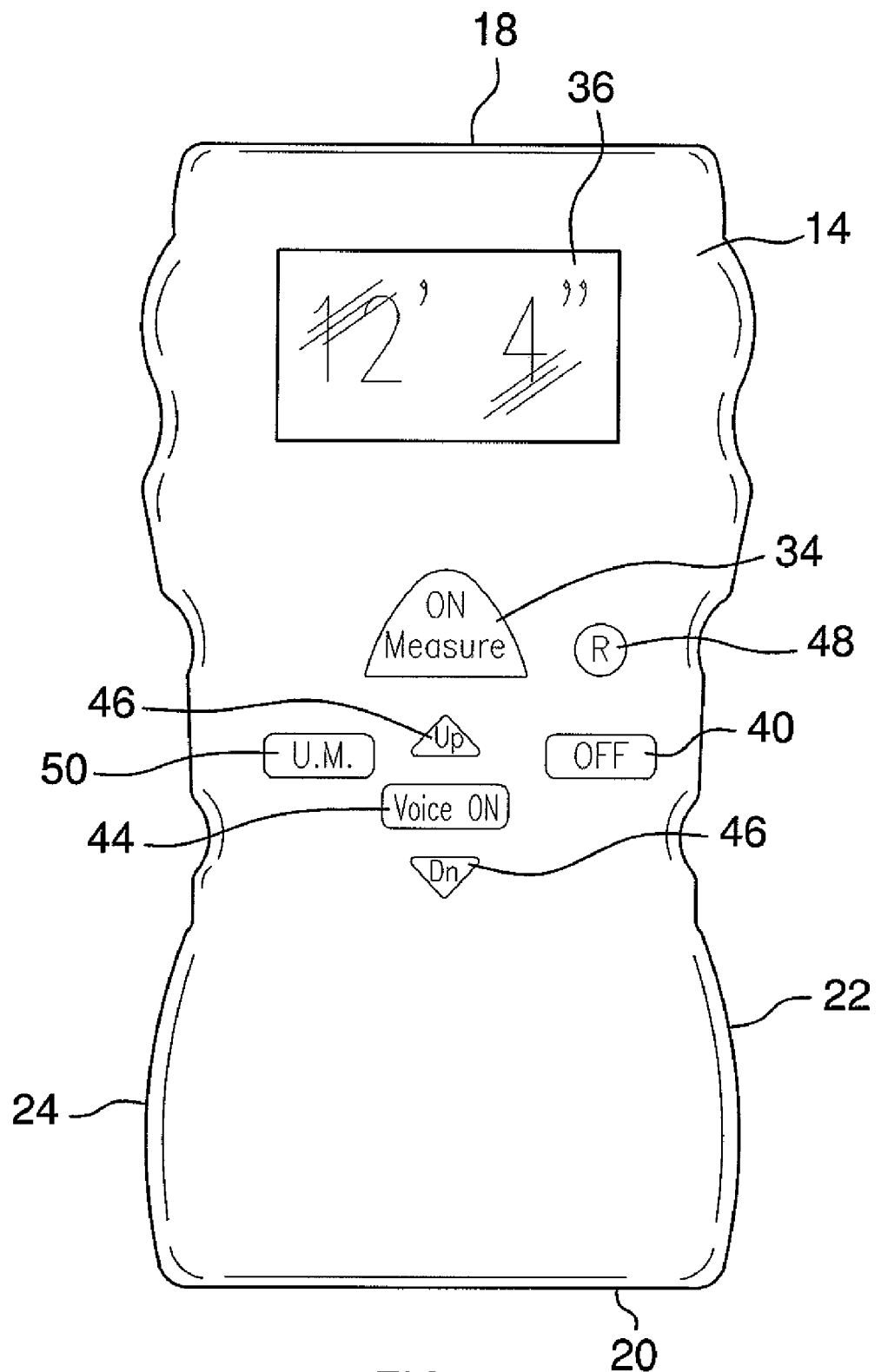
FIG. 2 is a top view of an embodiment of the disclosure.
Figure 3:
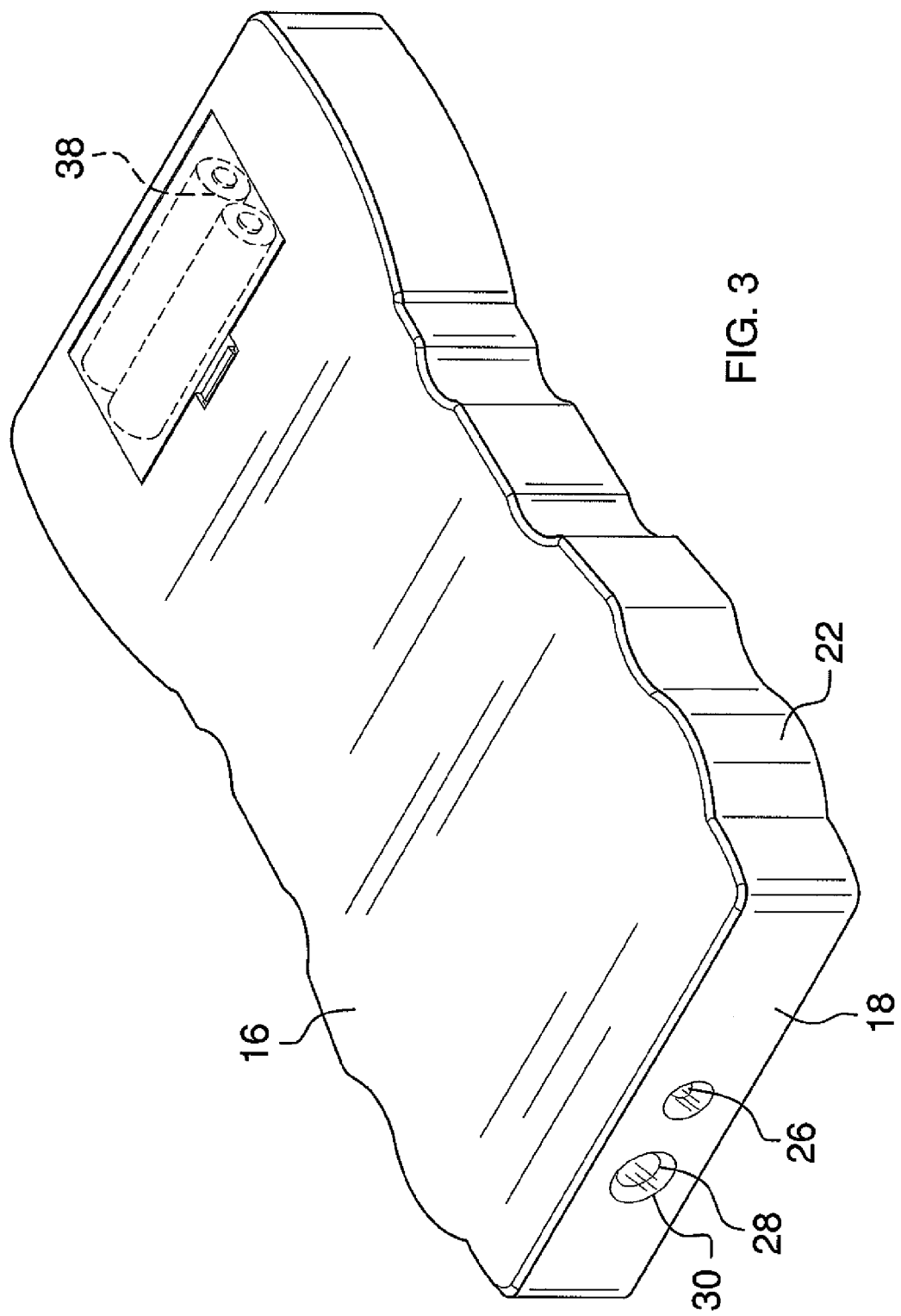
FIG. 3 is a bottom perspective view of an embodiment of the disclosure.
Figure 4:
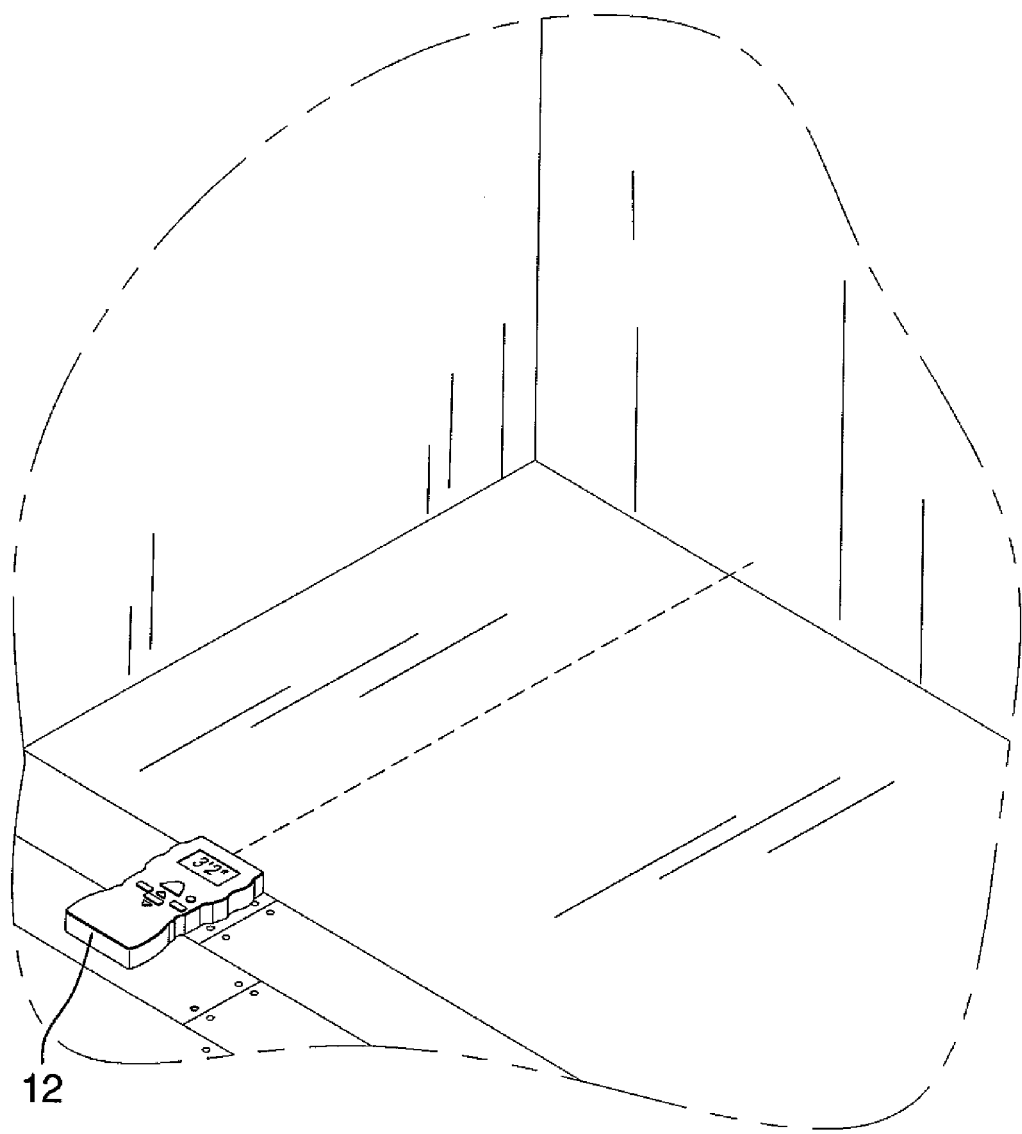
FIG. 4 is a perspective in-use view of an embodiment of the disclosure.
Figure 5:
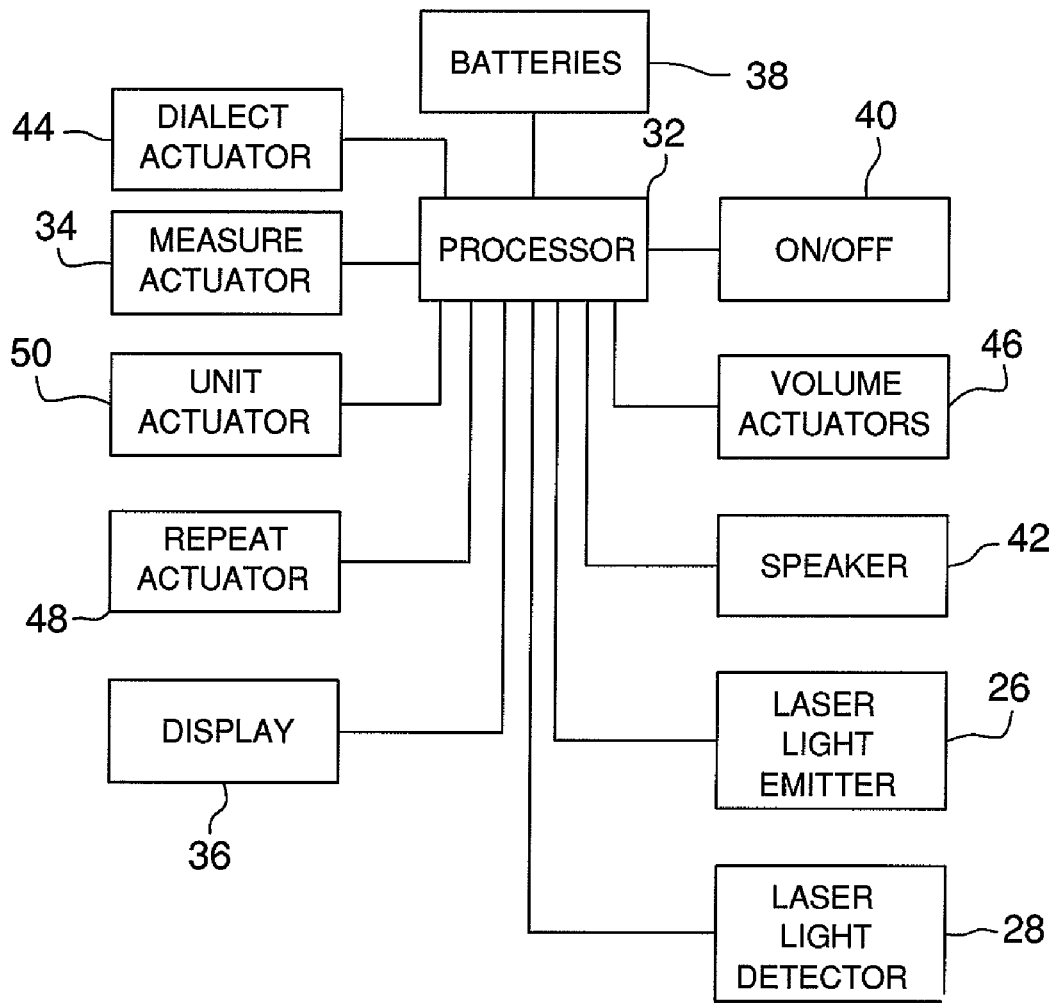
FIG. 5 is a schematic view of an embodiment of the disclosure.

With reference now to the drawings, and in particular to FIGS. 1 through 5 thereof, a new distance measuring device embodying the principles and concepts of an embodiment of the disclosure and generally designated by the reference numeral 10 will be described.

As best illustrated in FIGS. 1 through 5, the audible distance measuring assembly 10 generally comprises a housing 12 that has a top wall 14, a back wall 16, a front wall 18, a rear wall 20, a first lateral wall 22 and a second lateral wall 24. The housing 12 may have contoured lateral walls 22, 24 including grip depressions for more comfortable handling and holding of the housing 12. The housing 12 has a maximum width between the lateral walls 22, 24 between 2 inches and 4 inches, a length from the front wall 18 to the rear 20 wall between 3 inches and 8 inches and a depth between ½ inch and 2 inches.

A laser emitter 26 is mounted in the housing 12 and emits laser light outwardly of the front wall 18 when the laser emitter 26 is turned on. A light detector 28 is mounted in the housing 12 and captures light received through a window 30 in the front wall 18. The light detector 28 receives the laser light when the laser light is reflected off of an object.

A processor 32 is mounted in the housing 12 and is electrically coupled to the laser emitter 26 and the light detector 28. The processor 32 is programmed to determine a distance between the housing 12 and the object off of which the laser light is reflected. A measure actuator 34 is mounted on the housing 12 and is electrically coupled to the processor 32. The measure actuator 34 actuates the laser emitter 26 and the light detector 28 when the measure actuator 34 is actuated. The laser emitter 26, light detector 28 and processor 32 are conventional to laser light measuring devices. A display 36, which may be a liquid crystal display, is mounted on the housing 12 and is electrically coupled to the processor 32. The display 36 visually displays the distance. At least one battery 38 is mounted in the housing 12 and electrically coupled to the processor 32 to provide electricity to the processor 32. A power actuator 40 coupled to the processor 32 turns the processor off and may be used to also turn the processor on, though the measure actuator 34 may be sued to turn the processor 32 on as well.

A sound emitter 42 is mounted in the housing 12 and is electrically coupled to the processor 32. The processor 32 is programmed to audibly indicate the distance. This may be accomplished with any conventional voice synthesizing voice programming. The processor 32 may be programmed to audibly emit the distance in one of a plurality of dialects. The term "dialect" here is referring to not only different languages but also regional intonations as well as the ability to use either a female or a male voice. This will ensure that the user of the assembly 10 will be able to understand the measurement being spoken. A dialect actuator 44 is mounted on the housing and is electrically coupled to the processor. The dialect actuator is actuated to select one of the dialects. The dialect actuator may also be used to turn on the sound emitter 42.

A volume actuator 46 is mounted on the housing 12 and is electrically coupled to the processor 32. The volume actuator 46 is actuated to select a volume of sound emitted by the sound emitter 42. A repeat actuator 48 is mounted on the housing and is electrically coupled to the processor 32. The distance is audibly repeated when the repeat actuator 48 is actuated. This will allow the user to repeat the distance just measured without having to re-measure the distance in order to ensure that the user correctly heard the distance being emitted by the speaker 42.

A unit actuator 50 is mounted on the housing 12 and is electrically coupled to the processor 32. The unit actuator 50 is actuated to alternate between units of measurement is utilized to indicate the distance. Typically the units will at least include English units and metric units.

In use, the assembly 10 is used as a conventional laser distance measuring device, however the assembly 10 includes a speaker 42 for audibly vocalizing the distance measured. This will ensure that the user will not misread the display 36 and will provide assistance for those users who have diminished vision.

With respect to the above description then, it is to be realized that the optimum dimensional relationships for the parts of an embodiment enabled by the disclosure, to include variations in size, materials, shape, form, function and manner of operation, assembly and use, are deemed readily, apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A measuring assembly comprising:
    a housing having a top wall, a back wall, a front wall, a rear wall, a first lateral wall and a second lateral wall;
    a laser emitter being mounted in said housing and emitting laser light outwardly of said front wall when said laser emitter is turned on;
    a light detector being mounted in said housing and capturing light received through a window in said front wall, said light detector receiving the laser light when the laser light is reflected off an object;
    a processor being mounted in said housing and being electrically coupled to said laser emitter and said light detector, said processor being programmed to determine a distance between said housing and the object off of which the laser light is reflected;
    a measure actuator being mounted on said housing and being electrically coupled to said processor, said measure actuator actuating said laser emitter and said light detector when said measure actuator is actuated;
    a sound emitter being mounted in said housing and being electrically coupled to said processor, said processor being programmed to audibly indicate the distance; and
    said processor being programmed to audibly emit the distance in one of a plurality of dialects, a dialect actuator being mounted on said housing and being electrically coupled to said processor, said dialect actuator being actuated to select one of said dialects.

2. The assembly according to claim 1, further including a display being mounted on said housing and being electrically coupled to said processor, said display visually displaying the distance.

3. The assembly according to claim 1, further including a unit actuator being mounted on said housing and being electrically coupled to said processor, said unit actuator being actuated to alternate between units of measurement being utilized to indicate the distance.

4. The assembly according to claim 1, further including a volume actuator being mounted on said housing and being electrically coupled to said processor, said volume actuator being actuated to select a volume of sound emitted by said sound emitter.

5. The assembly according to claim 1, further including a repeat actuator being mounted on said housing and being electrically coupled to said processor, the distance being audibly repeated when said repeat actuator is actuated.

6. A measuring assembly comprising:
    a housing having a top wall, a back wall, a front wall, a rear wall, a first lateral wall and a second lateral wall;
    a laser emitter being mounted in said housing and emitting laser light outwardly of said front wall when said laser emitter is turned on;
    a light detector being mounted in said housing and capturing light received through a window in said front wall, said light detector receiving the laser light when the laser light is reflected off an object;
    a processor being mounted in said housing and being electrically coupled to said laser emitter and said light detector, said processor being programmed to determine a distance between said housing and the object off of which the laser light is reflected;
    a measure actuator being mounted on said housing and being electrically coupled to said processor, said measure actuator actuating said laser emitter and said light detector when said measure actuator is actuated;
    a sound emitter being mounted in said housing and being electrically coupled to said processor, said processor being programmed to audibly indicate the distance;
    a display being mounted on said housing and being electrically coupled to said processor, said display visually displaying the distance;
    a unit actuator being mounted on said housing and being electrically coupled to said processor, said unit actuator being actuated to alternate between units of measurement being utilized to indicate the distance;
    a volume actuator being mounted on said housing and being electrically coupled to said processor, said volume actuator being actuated to select a volume of sound emitted by said sound emitter;
    said processor being programmed to audibly emit the distance in one of a plurality of dialects, a dialect actuator being mounted on said housing and being electrically coupled to said processor, said dialect actuator being actuated to select one of said dialects; and
    a repeat actuator being mounted on said housing and being electrically coupled to said processor, the distance being audibly repeated when said repeat actuator is actuated.

* * * * *